United States Patent [19]
Temos

[11] Patent Number: 5,894,739
[45] Date of Patent: Apr. 20, 1999

[54] COMPOUND REFRIGERATION SYSTEM FOR WATER CHILLING AND THERMAL STORAGE

[75] Inventor: Edward J. Temos, Seven Valleys, Pa.

[73] Assignee: York International Corporation, York, Pa.

[21] Appl. No.: 08/889,759

[22] Filed: Jul. 10, 1997

[51] Int. Cl.⁶ .................................................. F25D 19/04
[52] U.S. Cl. ................................................. 62/436; 62/510
[58] Field of Search .............................. 62/430–439, 510

[56] References Cited

U.S. PATENT DOCUMENTS

| | | |
|---|---|---|
| 2,185,022 | 12/1939 | Candor . |
| 2,269,053 | 1/1942 | Crawford . |
| 2,299,188 | 10/1942 | Stork et al. ................................. 62/101 |
| 2,620,635 | 12/1952 | Mautner et al. ............................... 62/4 |
| 3,386,499 | 6/1968 | Ostrander ................................... 165/29 |
| 3,648,479 | 3/1972 | Richardson . |
| 4,513,574 | 4/1985 | Humphreys et al. . |
| 4,646,530 | 3/1987 | Huenniger . |
| 4,815,527 | 3/1989 | Meckler ..................................... 165/50 |
| 4,928,493 | 5/1990 | Gilbertson et al. ......................... 62/185 |
| 4,944,156 | 7/1990 | Yamamoto . |
| 4,964,279 | 10/1990 | Osborne . |
| 5,044,172 | 9/1991 | Inoue . |
| 5,065,598 | 11/1991 | Kurisu et al. . |
| 5,307,642 | 5/1994 | Dean . |
| 5,381,671 | 1/1995 | Saito . |
| 5,383,339 | 1/1995 | McCloskey et al. ..................... 62/238.5 |

FOREIGN PATENT DOCUMENTS

| | | |
|---|---|---|
| 0 348 771 A2 | 6/1989 | European Pat. Off. . |
| 0 602 911 A1 | 6/1994 | European Pat. Off. . |
| 275737 | 6/1914 | Germany ................................. 62/434 |
| 37 04182 A1 | 8/1988 | Germany . |
| 129986 | 11/1927 | Switzerland ............................ 62/434 |
| 2 180 329 | 3/1987 | United Kingdom . |

*Primary Examiner*—Henry A. Bennett
*Assistant Examiner*—Melvin Jones
*Attorney, Agent, or Firm*—Finnegan, Henderson, Farabow, Garrett & Dunner, L.L.P.

[57] ABSTRACT

A compound refrigeration system is provided for use with a thermal storage system. A water chiller and a brine chiller are provided, with a primary compressor pulling refrigerant through the water chiller and a booster compressor pulling refrigerant through the brine chiller and applying the refrigerant to the inlet of the primary compressor. The high pressure stage compressor and the low pressure stage booster compressor operate simultaneously during nighttime hours, chilling both water for air conditioning and brine for making ice. Only the high pressure stage compressor operates during daylight hours, chilling water which is further chilled by heat exchange with the ice formed during the night.

19 Claims, 4 Drawing Sheets

COMPOUND REFRIGERATION SYSTEM FOR WATER CHILLING AND THERMAL STORAGE

BACKGROUND OF THE INVENTION

1. Field of the Invention

The present invention relates to a refrigeration system. More specifically, the present invention relates to a compound refrigeration system used to air condition a building or the like.

2. Description of the Related Art

Due to existing utility rate structures, electricity is most expensive during periods of peak demand, e.g., during daylight hours, and least expensive during periods of low demand, e.g., during nighttime hours. Daylight hours also typically are the time of highest air temperatures and human activity. Consequently, peak air conditioning loads usually occur in the afternoon, at the time that energy use is highest and electricity is most expensive. Minimum air conditioning loads typically occur at night, when energy demand is lowest and electricity is least expensive.

Thermal storage systems have been proposed for air conditioning spaces. The concept of thermal storage is to generate a cooling potential in the evening hours when energy is least expensive, store the cooling potential, and use the cooling potential to cool air during daylight hours, when energy is most expensive.

Conventional thermal storage systems include a single compressor, a single chiller, and a condenser. The compressor compresses a refrigerant, e.g., freon, which gives up its heat in the condenser, then cycles through the chiller. During daylight hours, water is flowed through the chiller to be chilled by the refrigerant. The chilled water then is used to cool the air, according to conventional chiller techniques. During nighttime hours, however, a brine solution, e.g., ethylene glycol or the like, is flowed through the chiller. The chilled brine is then used to freeze water into ice. This ice is then available to chill water during the following day.

Conventional thermal storage systems have drawbacks. The single compressor and chiller can be used only to chill water or to chill brine, not both. Consequently, if it is necessary to chill water for air conditioning purposes during the nighttime, a separate refrigeration/air conditioning system is often needed. This is inefficient and expensive.

SUMMARY OF THE INVENTION

The present invention has been provided to correct one or more drawbacks with conventional refrigeration systems and thermal storage systems described above.

In accordance with the present invention, a compound refrigeration system includes a primary compressor, a condenser, an expansion valve, a water chiller, a booster compressor, a brine chiller, and a refrigerant circuit in which the primary compressor pulls refrigerant through the water chiller and applies it to the condenser and the booster compressor pulls refrigerant through the brine chiller. The primary compressor and the booster compressor are connected in series within the refrigerant circuit, with an output of the booster compressor being in fluid communication with the input of the primary compressor. The primary compressor and the booster compressor are operated simultaneously during a first selected time interval, and the booster compressor is deenergized during a second selected time interval. Preferably, the first selected time interval includes nighttime hours, while the second selected time interval includes daylight hours.

Preferably at least the brine chiller, and more preferably both the water chiller and the brine chiller, include refrigerant level controls that sense the level of refrigerant in a chiller and control the opening or closing of an expansion valve, or other valve, serving the respective chiller. When the booster compressor is turned off and the refrigerant level in the brine chiller reaches a predetermined level, the level control for the booster chiller serves to close the expansion valve. As a result, no refrigerant flows through the brine chiller until the booster compressor is reactivated.

The compound refrigeration system of this invention preferably is included in a thermal storage system where ice is produced for later cooling water to be used to cool a space. During the first selected time interval, the refrigerant system chills both water, for cooling air, and brine, for making ice in a ice storage unit. During the second selected time interval, with the booster compressor deenergized, the water is chilled by one or both of the water chillers and the ice in the ice storage unit.

Additional objects and advantages of this invention will be set forth in the description which follows, and in part will be obvious from the description, or may be learned by practice of the invention. The objects and advantages of the invention may be realized and obtained by means of the combinations particularly pointed out in the claims.

BRIEF DESCRIPTION OF THE DRAWINGS

The accompanying drawings, which are incorporated in and constitute a part of the specification, illustrate a preferred embodiment of the invention and, together with the general description given above and the detailed description given below, serve to explain the principles of the invention. In the drawings.

DETAILED DESCRIPTION OF THE PREFERRED EMBODIMENTS

Reference will now be made in detail to the selected embodiments of the invention as illustrated in the accompanying drawings.

As explained more fully below, the invention is directed to a compound refrigeration system that preferably is used in a district cooling application, where a large plant uses chilled water to condition the building space and produces ice during the evening hours when energy costs are lowest. The compound refrigeration system of the present invention simultaneously produces ice and cools the building space, during evening hours. The cooling capacity of the ice made by the system during the evening hours is then used during the daytime hour to cool the water and thereby reduce the water chilling loads during the daytime, when energy is most expensive. The system preferably has a refrigerant circuit in which two compressors are placed in a series arrangement, as explained more fully below.

Figure 1:
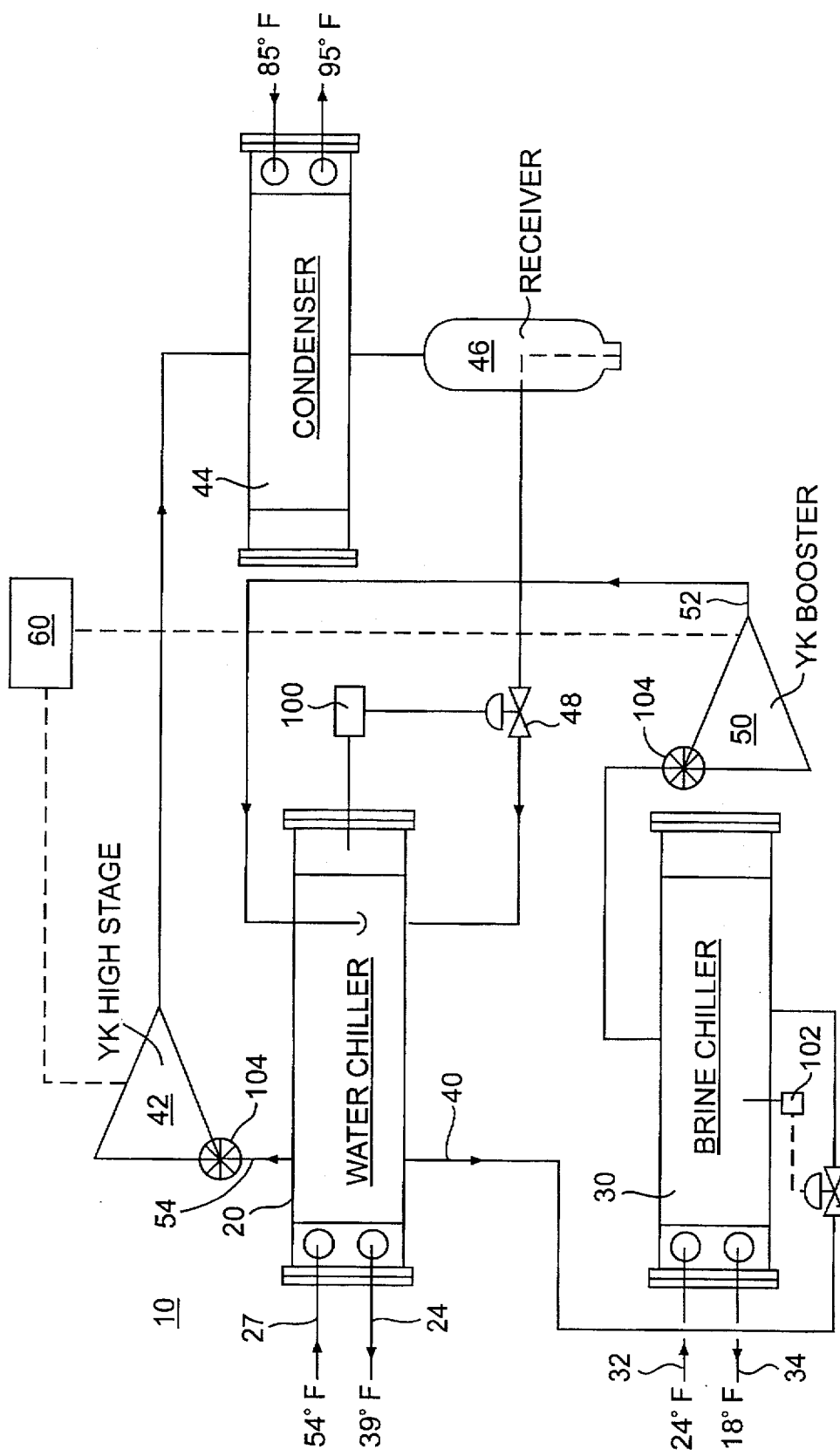
FIG. 1 is a schematic view of a compound refrigeration system in accordance with the invention.

In accordance with the invention, there is provided a compound refrigeration system. As shown in FIG. 1, the compound refrigeration system is designated generally by reference numeral 10. This system includes a high stage, primary compressor 42 for compressing a refrigerant, a condenser 44 for liquefying the refrigerant, a receiver 46 for holding a charge of liquid refrigerant, an expansion valve 48, a water chiller 20, a brine chiller 30, and a low stage booster compressor 50.

When the low stage booster compressor 50 is turned off, the refrigerant flows from the primary compressor 42, through the condenser 44, through the receiver 46, through expansion valve 48, through the water chiller 20, and then back to the high stage compressor. For that application, water flowing through the water chiller is cooled and then applied to cool one or more spaces in the building. When the booster compressor 50 is turned on, some of the liquid refrigerant in the water chiller flows through expansion valve 56, through brine chiller 30, through low stage compressor booster 52, through water chiller 20, and then into the high stage primary compressor 42. The gas refrigerant from the outlet of the booster compressor 52 is preferably applied to the top half of the water chiller, where it mixes with gas refrigerant boiled off from the liquid refrigerant in the chiller.

The water chiller 20 is of a type that is well known in the art. Water chiller 20 receives water at input 22, chills the water through heat exchange between the flowing water and a refrigerant in the chiller, and outputs chilled water at output 24. The water chiller of the invention receives cold refrigerant from expansion valve 48 and hot gaseous refrigerant from booster compressor 50, when it is operating. Preferably, the cold refrigerant from the expansion valve 48 is applied to the bottom half of the water chiller, and the hot refrigerant is applied to the top half. As the water is cooled, gas refrigerant boils off into the top half of the chiller and is ultimately applied to primary compressor 42. By means of example only, water chiller 20 can have a cooling capacity to accept input water at approximately 54° F. and cool it to output water at approximately 39° F.

The brine chiller 30 is also of a type well known in the art. Brine chiller 30 receives a brine solution at input 32, chills the brine solution through heat exchange between the brine solution and a refrigerant, and outputs chilled brine solution at output 34. The brine solution can be a variety of different fluids, as long as it can be cooled below the freezing temperature of water. In an exemplary embodiment of the invention, the brine solution is ethylene glycol. By means of example only, the brine chiller 30 can have a cooling capacity to accept input brine solution at approximately 24° F. and output chilled brine solution at approximately 18° F.

The high stage compressor 42 pulls gas refrigerant from the water chiller, and the low stage booster compressor 50 pulls gas refrigerant from the brine chiller. The primary compressor and the booster compressor are connected in series, preferably through the upper portion of the water chiller. This indirect connection is preferred since it permits the hot gas from the booster compressor to be chilled to some degree and mixed with other refrigerant gas in the water chiller, before it is applied to the primary compressor. The output of the low stage booster compressor can, however, be connected directly to an input of the high pressure stage compressor and still provide significant benefits of the present invention.

As shown in FIG. 1, a refrigerant circuit 40 is provided, containing any one of several well known refrigerants, e.g., freon or the like. The primary compressor 42 is preferably positioned proximate the water chiller 20 and serves to cycling the refrigerant from water chiller 20 to condenser 44.

Compressed refrigerant from compressor 42 gives up its heat of compression in condenser 44, according to conventional techniques. The refrigerant is then fed to a receiver 46, which is a conventional closed vessel for holding a supply of refrigerant and permitting the amount of refrigerant in the working circuit to fluctuate, according to operating conditions, as is known in the art.

The refrigerant is then applied to an expansion valve 48 which in the preferred embodiment is a multi-position valve that is selectively opened or closed, by a control. In the preferred embodiment, the control is or includes a liquid level control 100 on the water chiller. The liquid level control in the water chiller senses the level of liquid refrigerant in the water chiller and serves to keep that level at a predetermined level, to keep the heat exchanger tubes immersed in refrigerant. As the load applied to the water chiller increases and refrigerant boils off, the control operates to open the expansion valve and increase the flow of refrigerant to the chiller, to thereby meet the cooling needs of the system. A variety of different sensors, control systems, and multi-position valves can be used to provide this result.

The refrigerant system of the present invention further includes a low stage booster compressor 50 that preferably is positioned proximate brine chiller 30. As shown in FIG. 1, an output 52 of booster compressor 50 is connected in series with an input 54 of high pressure stage compressor 42, preferably through water chiller 20. The refrigerant gas compressed by low stage compressor 50 is heated during that operation and preferably is cooled and mixed with the cooler refrigerant gas in the water chiller. The resultant mixture of the refrigerant gas in the water chiller is then introduced to the high stage compressor.

In the preferred embodiment, the valve 56 serving the brine chiller is open and closed by a liquid level control 102 which operates in the same manner as control 100 of the water chiller. When the booster compressor 52 is turned off, the refrigerant in the brine chiller will reach a predetermined level and the control will close valve 56, effectively cutting off the flow of refrigerant to or from the brine chiller and the booster compressor. When the booster compressor is activated, the level control opens or closes the valve, as load conditions warrant.

Preferably the compressors of the present invention include a prerotation vanes 104 to control the capacity of the respective compressor as it is operated. The use and operation of such prerotation vanes is known in the art. The expansion valve 48 and 56 serving the water and brine chiller, respectively, are preferably multi-position valves that can be selectively opened or closed to control of the flow of refrigerant through the chillers.

The invention preferably includes a control for controlling the operation of at least the high pressure stage compressor and low pressure stage booster compressor. As shown in FIG. 1, a controller 60 is connected electrically to both primary compressor 42 and booster compressor 50. During normal operation, controller 60 generally causes the high stage compressor to operate continuously and causes both the primary and booster compressors to operate simultaneously, at certain predetermined times. The control typically would be part of the overall control for the HVAC system into which the compound refrigeration system of the present invention would be incorporated. Such a control would include sensors, such as temperature sensors and flow sensors, and would control the operation of the compressors, and other elements of the system, to provide optimum and efficient operation. The specific controls to be applied to the system would depend upon the system as a whole and would be within the skills of persons skilled in the art. With respect to the present invention, that control would preferably run the high stage compressor at all times that cooling is required and would simultaneously operate both the primary and booster compressor when ice is to be made, preferably at times when electricity is less expensive.

In the present invention, both the primary compressor and the booster compressor will operate simultaneously during at least a first selected time interval. Preferably, the first selected time interval includes nighttime hours, when refrigeration demands are lower and the cost of electrical energy is minimized. In a simplified system, controller 60 therefore can be programmed to energize automatically both high stage compressor 42 and low stage booster compressor 50 during selected nighttime hours, e.g., from 8:00 p.m. through 8:00 a.m. In a more complex control, the booster can be operated at more select hours when energy costs are lowest, or it can be operated based on additional parameters, such as the sensed temperatures.

In the invention only the high stage compressor will operate during a second selected time interval, with the low pressure stage booster compressor being deenergized during this period. Preferably, the second selected time interval includes daylight hours, when refrigeration demands and electrical energy costs are maximized. Controller 60 can therefore be programmed to deenergize low stage booster compressor 50 at a selected time, e.g., 8:00 a.m., and reenergize booster compressor 50 at another selected time, e.g., 8:00 p.m. Alternatively, low pressure stage booster compressor 50 can be deenergized and reenergized manually at the selected times.

The compound refrigeration system of the present invention can be incorporated into a variety of different district cooling applications, where chilled water is used to cool spaces to be conditioned with one or more buildings. In a simplified version, a single compound unit of the present invention can be used as the single source to chill the water. In such a system the brine solution from the brine chiller is connected to a ice storage unit, such as a tank, where ice is produced to further cool the water. The water therefore is cooled by at least the water chiller of the present invention and is often further cooled as it flows through the ice storage unit in a heat exchange relationship with the ice.

In more complex systems, two or more compound refrigerations systems of the present invention can be used. Similarly, one or more compound refrigeration systems of the present invention can be used along with one or more single compressor conventional refrigeration systems dedicated to only a water chiller, or a brine chiller.

Figure 2:
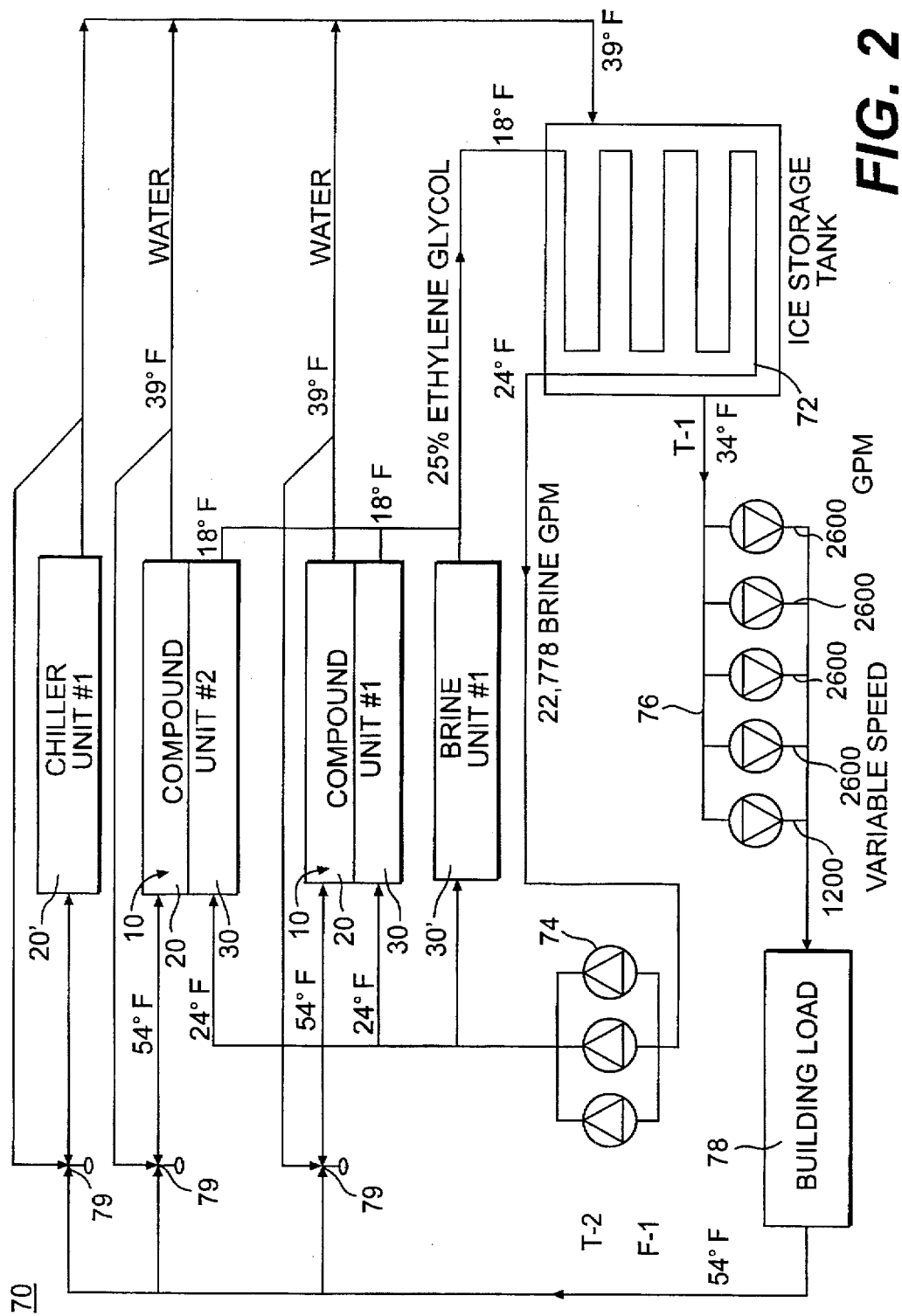
FIG. 2 is a schematic view of a compound refrigeration system of the invention used with a thermal storage system, such as an ice storage tank.

FIG. 2 illustrates an embodiment illustration how two compound units of the present invention can be incorporated into a system, which also includes conventional chiller system. As shown, a HVAC, thermal storage system 70 includes two compound refrigeration systems 10, which includes the components shown in FIG. 1, including a water chiller 20 and a brine chiller 30. The compound refrigeration systems 10 can be further connected with an individual water chiller 20' and an individual brine chiller 30', both of these chillers being served by a conventional refrigeration system with a single compressor.

In the invention, each brine chiller 30 receives brine solution, and outputs chilled brine solution. The chilled brine solution is routed to an ice storage unit 72 to make ice for thermal cooling, and then is returned via a pump assembly 74 to the brine chillers 30. In one embodiment of the invention, once the system is operating, the brine solution enters the brine chiller at approximately 24° F. and exits at approximately 18° F. In that embodiment, the heat transfer at ice storage tank 72 increases the temperature of the brine solution to approximately 24° F.

In an exemplary embodiment, each water chiller 10 receives water at approximately 54° F., and outputs chilled water at approximately 39° F. At least when ice has been produced in ice storage tank 72, the chilled water flows through ice storage tank 72, where it is further cooled to approximately 34° F. The 34° F. chilled water is routed via a pump assembly 76 to cool the building, represented in FIG. 2 by building load 78. As the water cools the space, it raises to a temperature of approximately 54° F. and then is returned to water chillers 10 via valves 79. Under certain conditions, one or more of the valve 79 that serve chillers 10 of the compound units and chiller 20 of the single unit can be controlled to cause the water to bypass the respective chiller. These valves and the units can be controlled according to the cooling needs of the system. Similar valves and bypass circuits can be included to control the flow of brine through one or all chillers that chill the brine solution.

Although FIG. 2 depicts two compound refrigeration systems 10, plus an additional water chiller 20' and brine chiller 30' in thermal storage system 70, this arrangement is merely an example of one HVAC system and is not required. It is within the scope of the invention to provide only a single compound refrigeration system 10 with thermal storage system 70, or to provide any number of combinations.

The size and capacity of the compound refrigeration system 10 of the present invention can be selected to meet the requirements of the building to be conditioned. In all such systems, the high pressure stage compressor 42 will be capable of continuous daytime and nighttime operation. Under one example, during daytime operation, with low stage booster compressor 50 turned off, high stage compressor 42 has a capacity of approximately 2000 refrigeration tons of water chilling. During nighttime operation, with both the primary and the booster compressors operating simultaneously, the brine chilling generates approximately 1300 tons of ethylene glycol chilling, while the water chilling generates approximately 658 tons of refrigerant chilling.

Figure 3A:
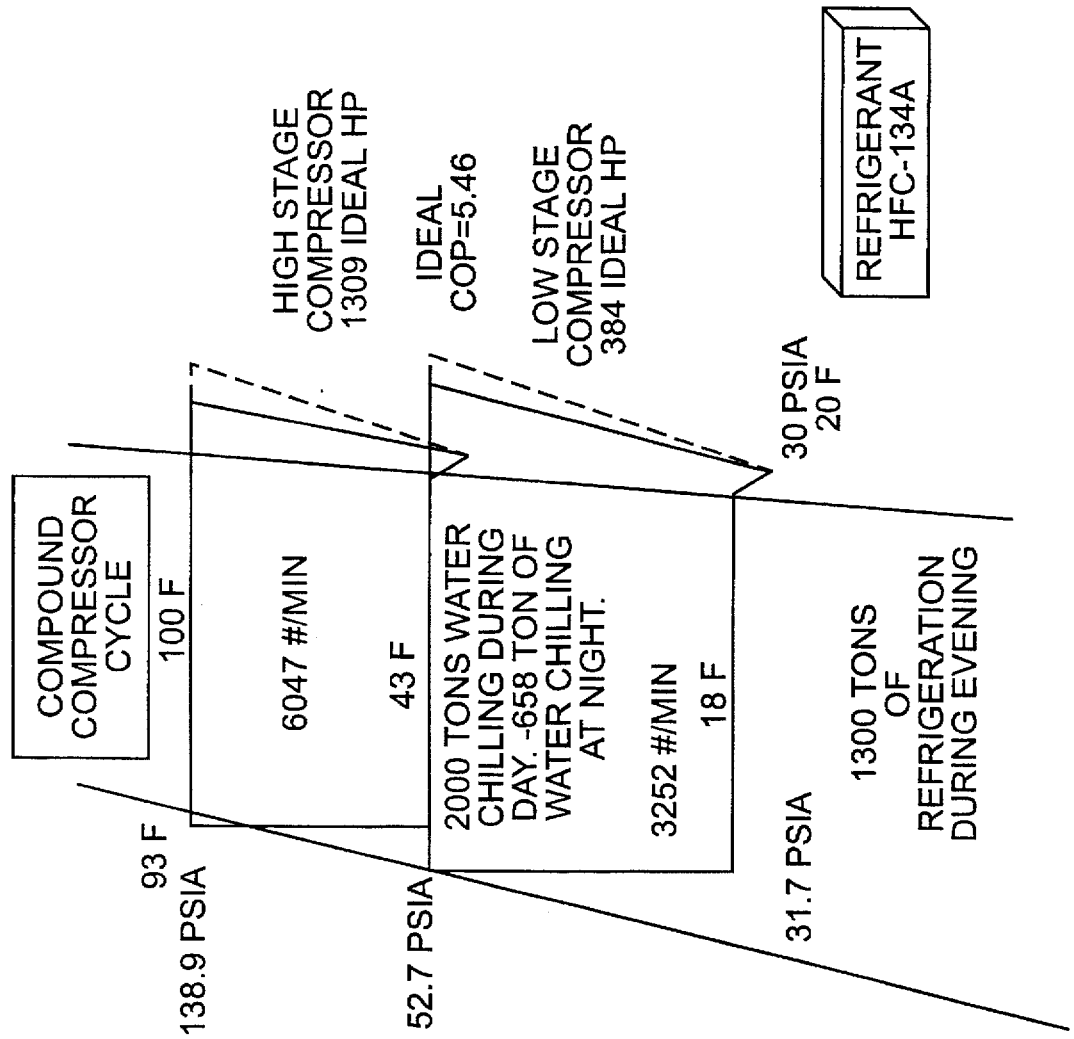
FIG. 3a is a pressure-enthalpy diagram for a compound compressor cycle in accordance with the invention.
Figure 3B:
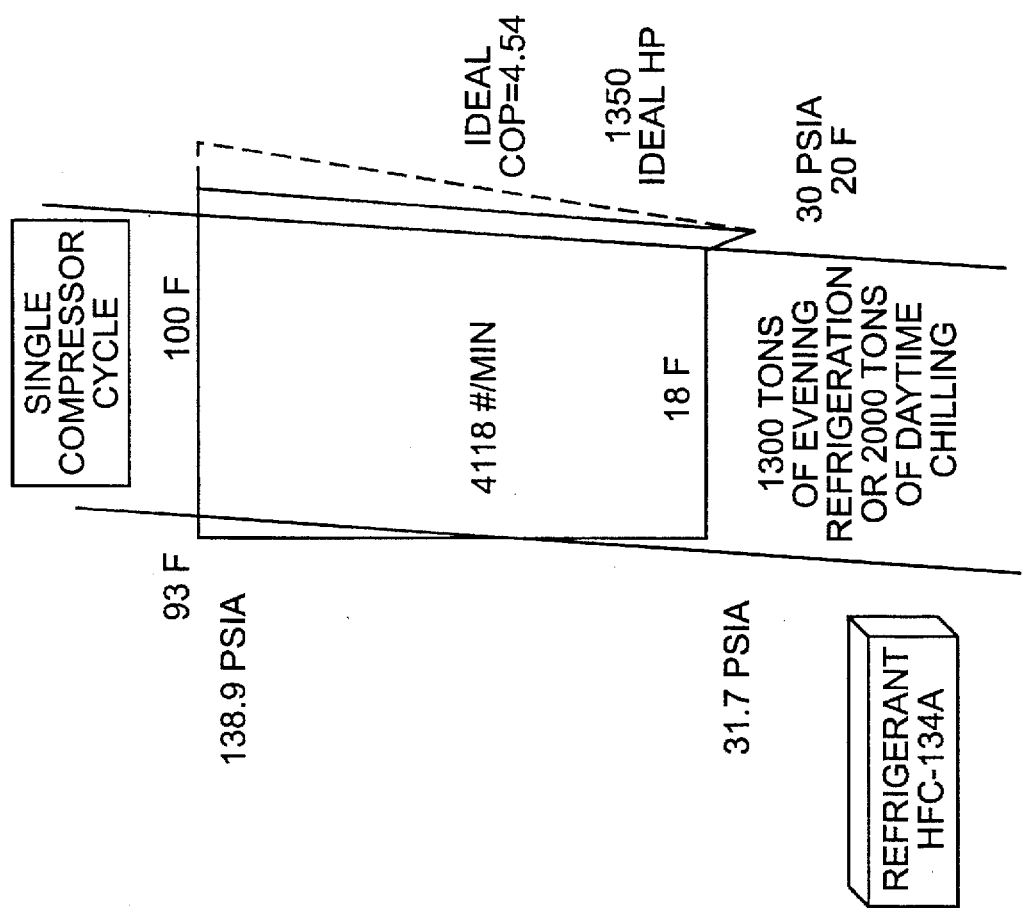
FIG. 3b is a pressure-enthalpy diagram for a single compressor cycle in a conventional thermal storage system.

FIGS. 3A and 3B depict pressure-enthalpy diagrams for the compound refrigeration system 10 of the present invention, in comparison with a single compressor conventional system, during nighttime operation. By utilizing a high pressure stage compressor and a low pressure stage booster compressor compounded in a series cycle, both compressors operated at lower compression ratios and therefore better efficiency. In addition, the mass flow in the low pressure stage booster compressor and the rest of the cycle is reduced. As can be seen from FIGS. 3A and 3B, the ideal coefficient of performance (COP) for the compound refrigeration system 10 of the invention is 5.46, whereas the ideal COP for the conventional single compressor system, which can only either chill water or chill glycol solution, is 4.54. This represents a 20% increase in performance for the compound refrigeration system of the present invention.

Additional advantages and modifications will readily occur to those skilled in the art. The invention in its broader aspects is, therefore, not limited to the specific details and representative systems described above. Departures from such details can be made without departing from the spirit or scope of the invention. The scope of the invention is established by the following claims, and their equivalents.

What is claimed is:

1. A compound refrigeration system comprising:
   a primary compressor;
   a condenser;
   an expansion valve;
   a water chiller;
   a booster compressor;
   a brine chiller; and
   a refrigerant circuit in which the primary compressor pulls refrigerant through said water chiller and applies it to the condenser and the booster compressor selectively pulls refrigerant through said brine chiller, said primary compressor and said booster compressor being connected in series with the output of said booster compressor being in fluid communication with the input of said primary compressor.

2. The compound refrigeration system of claim 1, further comprising an ice storage unit, wherein the refrigerant applied to said brine chiller chills a fluid that is applied to the ice storage unit for making ice.

3. The compound refrigeration system of claim 1, wherein the refrigerant applied to said water chiller chills water for cooling air.

4. The compound refrigeration system of claim 1, further including a control that simultaneously operates said booster compressor and said primary compressor during a first selected time interval.

5. The compound refrigeration system of claim 4, wherein the first selected time interval includes nighttime hours.

6. The compound refrigeration system of claim 4, wherein said control deenergizes said booster compressor during a second selected time interval.

7. The compound refrigeration system of claim 6, wherein the second selected time interval includes daytime hours.

8. The compound refrigeration system of claim 1, further comprising a level control on said brine chiller for sensing the level of refrigerant in the brine chiller and cutting off the flow of refrigerant to the brine chiller, when the refrigerant level reaches a predetermined level.

9. A compound refrigeration system comprising:
   a primary compressor;
   a condenser;
   an expansion valve;
   a water chiller;
   a booster compressor;
   a brine chiller;
   a refrigerant circuit providing refrigerant to said water chiller and selectively to said brine chiller with the primary compressor pulling refrigerant through said water chiller and applying it to the condenser and with the booster compressor selectively pulling the refrigerant through said brine chiller, said primary compressor and said booster compressor operating in series with the output of the booster compressor being in fluid communication with the input of the primary compressor; and
   a control that simultaneously operates the primary and secondary compressor during a first selected time interval and deenergizer said booster compressor during a second selected time interval.

10. The compound refrigeration system of claim 9, further comprising an ice storage unit, wherein the refrigerant applied to said brine chiller chills a fluid that is applied to the ice storage unit for making ice.

11. The compound refrigeration system of claim 9, wherein the refrigerant applied to said water chiller chills water for cooling air.

12. The compound refrigeration system of claim 9, wherein the first selected time interval includes nighttime hours.

13. The compound refrigeration system of claim 9, wherein the second selected time interval includes daytime hours.

14. The compound refrigeration system of claim 9, further comprising a means to cut off the flow of refrigerant to the brine chiller, when the booster compressor is not on.

15. A thermal storage system, comprising:
   a primary compressor;
   a condenser;
   an expansion valve;
   a booster compressor;
   a water chiller to chill water, the chilled water used to cool a space;
   a brine chiller to chill a fluid;
   an ice bank configured to make ice with the chilled fluid received from the brine chiller; and
   a refrigerant circuit configured to provide refrigerant to said water chiller and selectively to said brine chiller with the primary compressor pulling refrigerant through said water chiller and applying it to the condenser and with the booster compressor pulling the refrigerant through said brine chiller, said primary compressor and said booster compressor being in series with the output of said booster compressor being in fluid communication with the input of the primary compressor.

16. The thermal storage system of claim 15, wherein refrigerant flows from said condenser through said expansion valve and into the water chiller and wherein the refrigerant compressed by the booster compressor is first applied to the water chiller and then to the input of the primary compressor.

17. The thermal storage system of claim 16 further comprising means for cutting off the flow of refrigerant to the brine chiller, when the booster compressor is off.

18. The thermal storage system of claim 17 further comprising a control for simultaneously operating both the primary and booster compressor simultaneously during a first selected time interval and operating only the primary compressor during a second selected time interval.

19. The thermal storage system of claim 18, wherein said flow cutting off means includes a level control on said brine chiller for sensing the level of refrigerant in the brine chiller and cutting off the flow of refrigerant to the brine chiller, when the refrigerant level reaches a predetermined level.

* * * * *